(12) United States Patent
Hasebe

(10) Patent No.: US 6,356,523 B1
(45) Date of Patent: Mar. 12, 2002

(54) APPARATUS FOR REPRODUCING INFORMATION RECORDED ON OPTICAL DISC

(75) Inventor: Seiichi Hasebe, Tokorozawa (JP)

(73) Assignee: Pioneer Electric Corporation, Tokyo (JP)

( * ) Notice: Subject to any disclaimer, the term of this patent is extended or adjusted under 35 U.S.C. 154(b) by 0 days.

(21) Appl. No.: 09/086,543

(22) Filed: May 29, 1998

(30) Foreign Application Priority Data

Jun. 2, 1997 (JP) .............................................. 9-144329

(51) Int. Cl.$^7$ ................................................ G11B 7/00
(52) U.S. Cl. ................................ 369/47.45; 369/47.38; 318/608; 388/805
(58) Field of Search .............................. 369/124.13, 50, 369/47.45, 47.46, 53.3, 47.38; 318/608; 388/805

(56) References Cited

U.S. PATENT DOCUMENTS

| | | | |
|---|---|---|---|
| 5,095,475 A | * 3/1992 | Ishikawa | 369/50 X |
| 5,163,035 A | * 11/1992 | Horikiri | 369/50 X |
| 5,430,582 A | 7/1995 | Hayashi | |
| 5,495,465 A | * 2/1996 | Arisaka | 369/50 R |
| 5,508,993 A | 4/1996 | Hayashi et al. | |
| 5,557,184 A | * 9/1996 | Hwang | 318/608 |
| 5,636,192 A | * 6/1997 | Shimizume et al. | 369/48 |
| 5,745,457 A | 4/1998 | Hayashi et al. | |
| 5,748,587 A | * 5/1998 | Sim | 369/50 |
| 5,754,437 A | * 5/1998 | Blazo | 702/75 |
| 5,901,128 A | * 5/1999 | Hayashi et al. | 369/124.13 X |
| 5,903,408 A | * 5/1999 | Omi | 369/44.32 X |
| 5,986,426 A | * 11/1999 | Rowan | 318/599 |
| 6,026,068 A | * 2/2000 | Obata et al. | 369/58 |
| 6,118,742 A | * 9/2000 | Matsui et al. | 369/50 |

FOREIGN PATENT DOCUMENTS

| | | |
|---|---|---|
| EP | 0 423 804 A2 | 4/1991 |
| EP | 0 883 124 A2 | 12/1998 |
| JP | 02 094169 | 4/1990 |
| JP | 04259916 | 9/1991 |
| JP | 6-231547 | 8/1994 |
| JP | 7-262694 | 10/1995 |
| JP | 8-235767 | 9/1996 |

OTHER PUBLICATIONS

IBM Tech. Disclosure Bulletin—Bol 36, No. 3 pp. 341–344 Abstract Only, Mar. 1993.*

* cited by examiner

*Primary Examiner*—Aristotelis M. Psitos
(74) *Attorney, Agent, or Firm*—Finnegan, Henderson, Farabow, Garrett & Dunner, L.L.P.

(57) ABSTRACT

An apparatus for reproducing information recorded on an optical disc which can favorably accomplish a time base correction for a read signal in a simple configuration. Also, the apparatus precisely removes jitter components produced when a driving signal is supplied to a spindle motor. The apparatus has a spindle motor for rotating an optical disc, a pickup for optically reading a recorded signal on the optical disc to generate a read signal corresponding to the recorded signal, and an A/D converter for digitizing the read signal to reproduced an encoded signal. The apparatus is provided with a controller for supplying the spindle motor with driving power. The controller has an unnecessary component removing filter for removing high frequency components from the motor driving power.

5 Claims, 18 Drawing Sheets

FIG.7

| CUT-OFF FREQUENCY fc [Hz] | R4 [Ω] | R2 [Ω] | fc' [Hz] |
|---|---|---|---|
| 4.0 k | 5.627k(→5.6k) | 2.814k(→2.7k) | 4.093k |
| 3.5 k | 6.430k(→6.8k) | 3.215k(→3.3k) | 3.518k |
| 3.0 k | 7.502k(→7.5k) | 3.751k(→3.9k) | 2.942k |
| 2.5 k | 9.003k(→9.1k) | 4.501k(→4.7k) | 2.433k |
| 2.0 k | 11.254k(→11 k) | 5.627k(→5.6k) | 2.028k |

FIG.16

|     | STOP MOTOR | ACCELERATE MOTOR | DECELERATE MOTOR |
|-----|------------|------------------|------------------|
| Sx  | Z          | H                | L                |
| Sy  | L          | H                | H                |

APPARATUS FOR REPRODUCING INFORMATION RECORDED ON OPTICAL DISC

BACKGROUND OF THE INVENTION

1. Field of the Invention

The present invention relates generally to an apparatus for reproducing information recorded on an optical disc, and more particularly to an information reproducing apparatus of this kind which performs the processing for optically reading and reproducing information recorded on an optical disc being rotated, while correcting the time base of the read information.

2. Description of the Related Art

Attempts have been made for reproducing digital information recorded on an optical disc in a high quality, particularly in the field of audio-related applications. One of such attempts involves a technique of reproducing a read signal at a high resolution. Specifically, a read signal is sampled at a high rate and converted to a digital signal using a large number of quantization bits. Another attempt involves an extension of a frequency band in which a read signal is reproduced. In other words, the latter attempt aims at faithfully outputting an audio signal in a high frequency band, as well, which has been essentially ignored.

Other than the attempts mentioned above, there are also indispensable factors for high quality reproduction. One of these factors is a so-called time base correction, i.e., a reduction in fluctuations (jitter) of a read signal on the time base. In the prior art, such time base correction has also been employed, and a variety of approaches have been proposed therefor.

However, a majority of such proposals rely on an idea of macroscopically performing the time base correction, and tend to treat lightly microscopical time base correction. For this reason, a jitter component escaping from the macroscopic time base correction is likely to remain and affects the quality of reproduced information. Therefore, there is yet room for improvement in the time base correction. Particularly for audio devotees who continue insatiable pursuit of ever higher sound quality, even a slight improvement in sound quality is extremely useful, so that a search for complete accomplishment of the time base correction is important.

Specifically, high frequency components in a driving signal supplied to a spindle motor of direct-current driving type is the cause of preventing highly stable control for the spindle motor.

Eventually, such a microscopic defect may be an obstacle to time base correction for a read signal and accordingly to reproduction of high quality information.

SUMMARY OF THE INVENTION

Therefore, the present invention has been made in view of the problem mentioned above, and its object is to provide an apparatus for reproducing information recorded on an optical disc which is capable of favorably correcting the time base of a read signal in a simple configuration.

It is another object of the present invention to provide an apparatus for reproducing information recorded on an optical disc which is capable of precisely removing a jitter component produced when a driving signal is supplied to a spindle motor.

An apparatus for reproducing information recorded on an optical disc according to the present invention comprises a spindle motor for rotating an optical disc, reading means for optically reading a recorded signal on the optical disc to generate a read signal corresponding to the recorded signal, digital converting means for digitizing the read signal to reproduce an encoded signal, and control means for supplying the spindle motor with driving power, where the control means has unnecessary component removing means for removing high frequency components from the driving power.

BRIEF DESCRIPTION OF THE DRAWINGS

FIG. 7 is a table showing the correspondence between a cut-off frequency set for the second-order active HPF 5 according to the embodiment and the values of resistors forming part of the HPF;

FIG. 5 is used;

FIG. 16 is a table showing levels exhibited by first and second control signals Sx, Sy supplied to the driving circuit of FIG. 15 corresponding to each operation mode of a spindle motor;

DETAILED DESCRIPTION OF THE PREFERRED EMBODIMENTS

Figure 1:
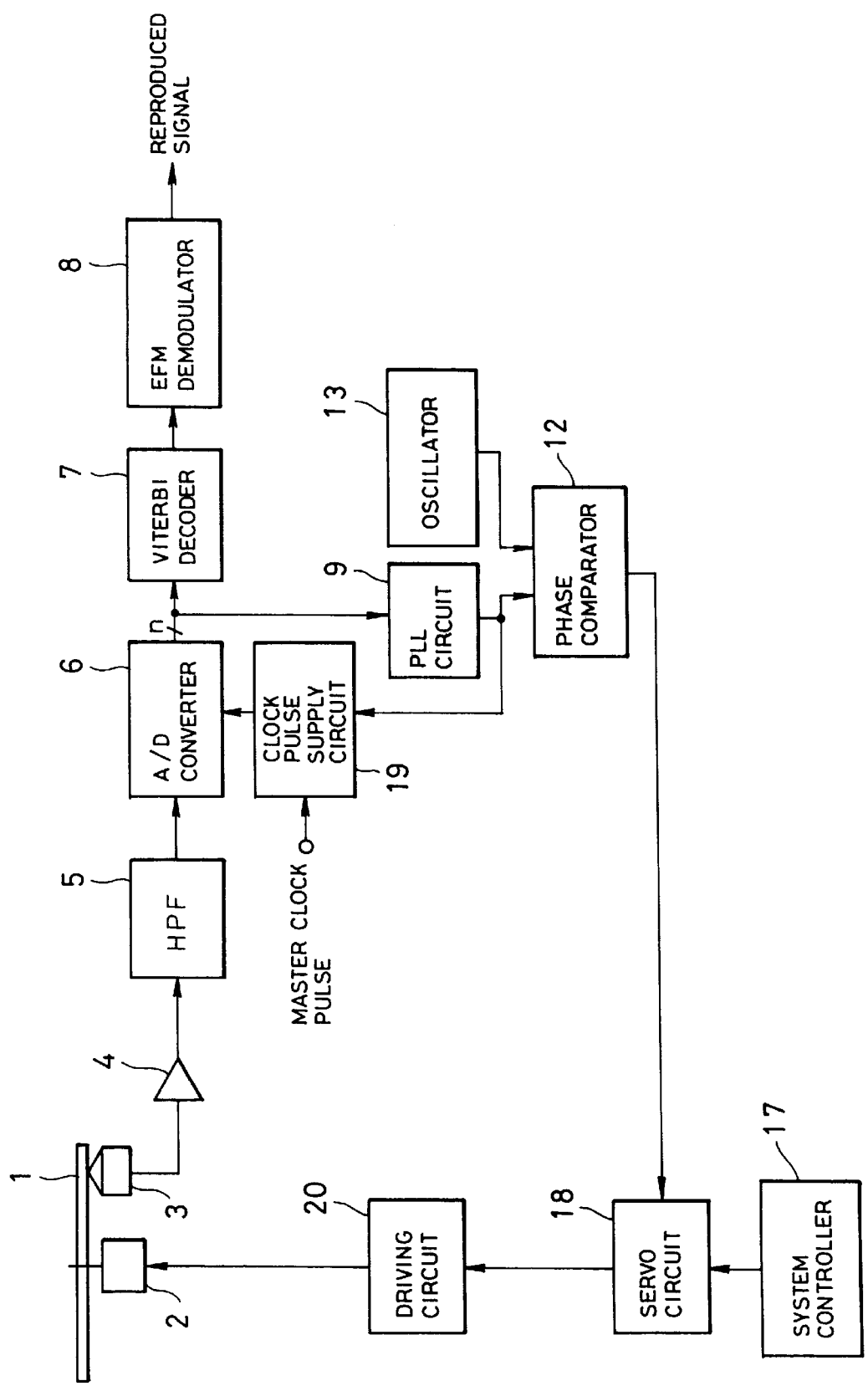
FIG. 1 is a block diagram illustrating a general configuration of an optical disc player according to an embodiment of the present invention.

Embodiments of the present invention will hereinafter be described in detail with reference to the accompanying drawings. FIG. 1 illustrates a general configuration of a CD (compact disc) player of an embodiment according to the present invention.

Referring specifically to FIG. 1, on a discoidal optical disc 1 set in this optical disc player, a recording signal representative of digital data, for example, audio data or the like is recorded as a pit sequence or a mark sequence, along a spiral track or concentric tracks. The optical disc 1 is rotated by a spindle motor 2, and digital data recorded on the optical disc 1 is optically read by an pickup 3 serving as a reading means. An RF (Radio Frequency) signal output from the pickup 3 is an analog signal indicative of a received amount of a light beam emitted from the pickup 3 and reflected off the optical disc 1 or a light receiving condition. The read signal is amplified by an RF amplifier 4 and then supplied to a high pass filter (HPF) 5 serving as a signal jitter removing means. The HPF 5, which realizes one of principle features of this embodiment together with its configuration later described, supplies only high frequency components of the read signal from the RF amplifier 4 to an A/D (Analog-to-Digital) converter 6. More specifically, the HPF 5 forms a signal processing means for removing low frequency noise components from the read signal without producing distortions in the time base direction.

The A/D converter 6 digitizes the read signal from the HPF 5. More specifically, the A/D converter 6 is supplied with a sample clock pulse from a clock pulse supply circuit 19, and samples the read signal in response to the sample clock pulse as well as outputs sample values of the read signal as a digital signal with a predetermined number of quantization bits n. The read signal as a sequence of the thus digitized sample values is supplied to a Viterbi decoder 7. Since details on this Viterbi decoder are well known in Laid-open Japanese Patent Application No. 7-262694 and so on, description thereon is omitted here. In summary, the Viterbi decoder calculates branch metrics and path metrics based on data of sample values sequentially supplied from the A/D converter 6 and data of a plurality of predicted sample values, respectively, and based on them, decodes and outputs a data series presenting a minimal square error with respect to an input series as decoded data corresponding to a recorded signal on a disc. The Viterbi decoding provides an exactly digitized version of a read signal, even if the read signal exhibits a low S/N ratio. As a result, the Viterbi decoding provides the discrimination of the value of "1" or "0" for each sample of the read signal, and the generation of a digital signal carrying these values.

The digitized read signal from the Viterbi decoder 7 is generally referred to as an EFM (Eight to Fourteen Modulation) signal. The EFM signal is supplied to a demodulator 7 which performs code conversion processing inverse to EFM modulation performed when a digital signal is recorded on the disc 1. The digital signal (reproduced signal) applied with such inverse encoding conversion processing is basically transferred to a further decoder, not shown, to be converted to an original digital signal which is then D/A converted and amplified to generate, for example, a speaker driving signal.

A PLL (Phase Lock Loop) circuit 9 detects a slanting portion of a read signal waveform based on the sample value data of the read signal from the A/D converter 6, and generates a reproducing clock pulse synchronized in phase with the read signal based on the sample value data at this slanting portion. The configuration and operation of this PLL circuit 9 are disclosed in Laid-open Japanese Patent Application No. 6-231547. The reproducing clock pulse is supplied to the clock pulse supply circuit 19 as well as to a phase comparator 12. The phase comparator 12 is connected to an oscillator 13 for generating a reference clock pulse. The phase comparator 12 generates an error signal indicative of a phase difference between the reproducing clock pulse from the PLL circuit 9 and the reference clock pulse. This error signal is supplied to a servo circuit 18.

The clock pulse supply circuit 19 supplies the A/D converter 6 with a master clock pulse as a sampling clock pulse when the frequency of the clock pulse from the PLL circuit 9 is not included in a predetermined frequency range, and supplies the A/D converter 6 with the clock pulse from the PLL circuit 9 instead of the master clock pulse as the sampling clock pulse when the frequency of the clock pulse from the PLL circuit 9 is included in the predetermined frequency range.

In the configuration of the optical disc player described above, the servo circuit 18 outputs a control signal to a driving circuit 20 for starting the rotation of the spindle motor 2 in response to a driving start instruction from a system controller 17. This causes the driving circuit 20 to supply the spindle motor 2 with a driving voltage for starting the rotation of the spindle motor 2. When the optical disc 1, rotated by the rotation of the spindle motor 2, reaches a predetermined rotational speed, the pickup 3 is enabled to read a recorded signal on the optical disc 1. In an initial condition immediately after the spindle motor 2 begins rotating, the A/D converter 6 is supplied with the master clock pulse from the clock pulse supply circuit 19, and the A/D converter 6 is operated in accordance with the generating timing of the master clock pulse.

The servo circuit 18, in turn, generates a control signal in accordance with the phase error signal from the phase comparator 12 and supplies the same to the driving circuit 20 when the disk 1 is rotated in a predetermined rotational speed range after the above-mentioned initial condition has passed. More specifically, the servo circuit 18 generates the control signal to reduce the supplied phase error signal, In this way, the spindle motor 3 is applied with precise servo sychronized in phase with the reference clock pulse, Then, in this case, the clock pulse supply circuit 19 supplies the A/D converter 6 with a reproducing clock pulse from the PLL circuit 9 as a sampling clock pulse, instead of the master clock pulse, so that the A/D converter 6 is operated in accordance with this reproducing clock pulse.

The driving circuit 20 includes a high cut filter (HCF) as a driving jitter removing means or an unnecessary component removing means, which is one of principle features of this embodiment. By supplying the spindle motor 2 with electric power through this high cut filter in the driving circuit 20, the occurrence of jitter is effectively avoided in a read signal. Details on this operation will be described later.

While a concept of a spindle servo system has so far been described, reference mm ay also be made to the configuration described in Laid-open Japanese Patent Application No. 8-235767 as a further detailed configuration.

Next, the configuration of the HPF 5 will be described as a means for removing jitter in the read signal.

Figure 2:
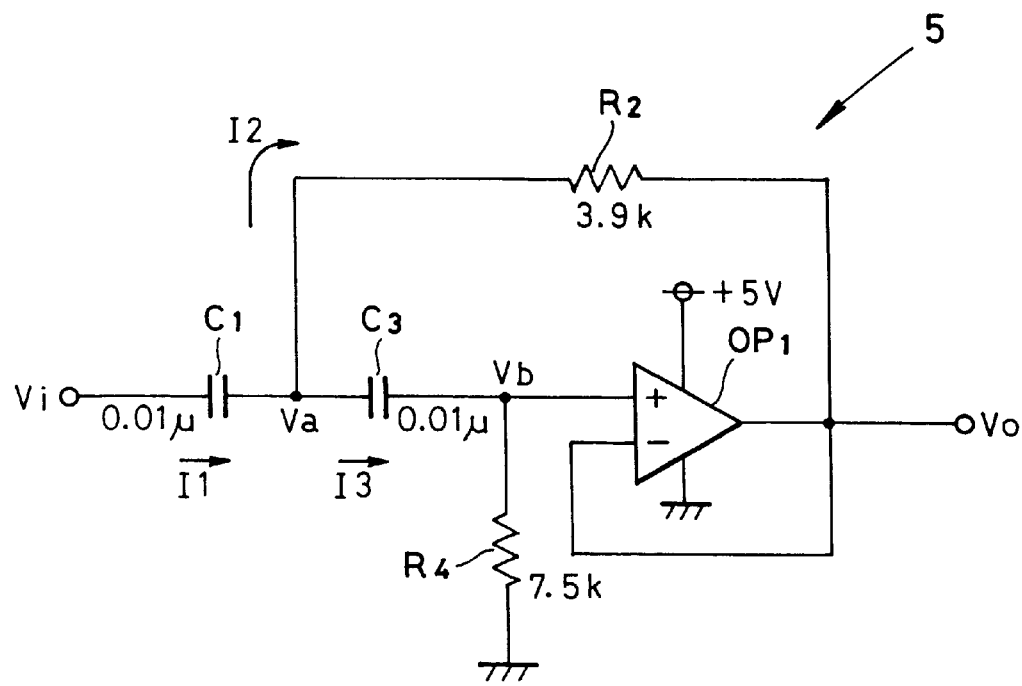
FIG. 2 is a circuit diagram illustrating a basic configuration of a high pass filter (HPF) 5 in the player of FIG. 1.

FIG. 2 illustrates a basic configuration of the HPF 5 which is supplied at an input terminal thereof with an analog read signal from the RF amplifier 4. This input terminal is connected to one end of a capacitor C1. The other terminal of the capacitor C1 and one end of a capacitor C3 are connected in common, and also connected to an output terminal of an operational amplifier OP1 through a resistor R2. The other terminal of the capacitor C3 is connected to a non-inverting input terminal of the operational amplifier OP1 as well as is grounded through a resistor R4. The operational amplifier OP1 has the output terminal connected to its inverting input terminal as well as lead to the output of the HPF 5.

The HPF 5 forms a so-called second-order active filter for the reason set forth below.

Figure 3:
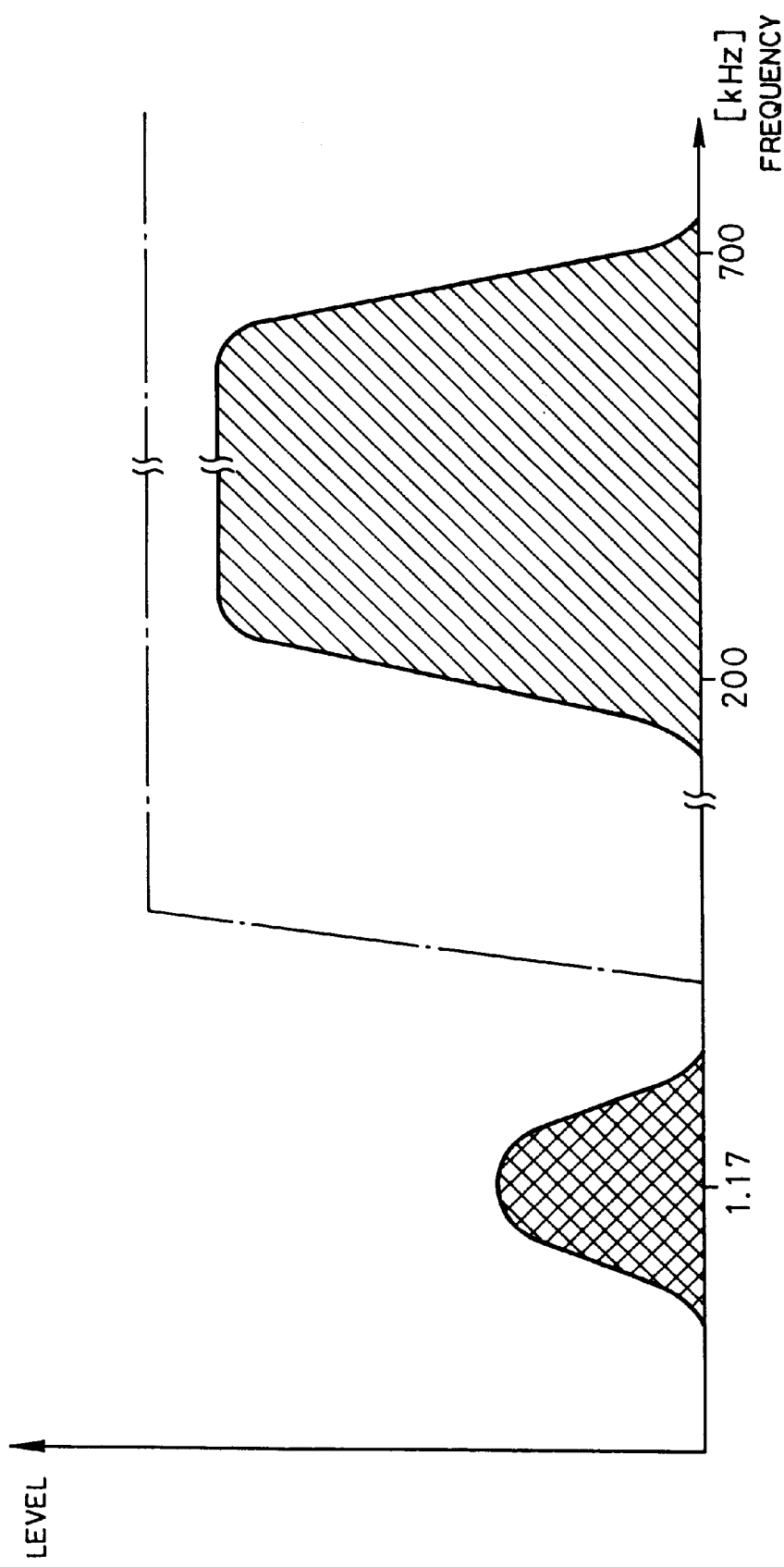
FIG. 3 is a characteristic diagram illustrating frequency components of a read signal output from an RF amplifier in the player of FIG. 1, and an ideal characteristic of the HPF 5.

First, an analysis on frequency components of the input read signal results in a spectrum as illustrated in FIG. 3. According to the graph of FIG. 3, it can be seen that the read signal has a boundary near 200 [kHz], and is composed of a primary component (hatched portion) forming a spectrum extending over a width of approximately 500 kHz in a frequency region higher than this boundary and having a relatively high level, and a secondary component (cross-hatched portion) forming a spectrum centered at approximately 1.17 [kHz] and having a relatively low level. Also, the primary component corresponds to an essential EFM signal component, while the secondary portion corresponds to noise components due to scratches on the surface of the disc 1, a recording surface or a surface of another internal layer, and improperly formed marks comparable to such scratches (hereinafter they are collectively referred to as the "black dots" or B.D.).

The basis of the these spectra formed as mentioned above may be interpreted as follows.

Since the EFM signal is defined to have a frequency range of 7.35 [kHz] for its six sample intervals and carry 588 bits in each interval, a read clock frequency fT for reading each bit of the EFM signal is calculated as:

$$fT = 7.35 \times 588 = 4.3218 \text{ [MHz]}$$

(bit interval T=1/4.3218)

Since data of the EFM signal varies an inversion interval in a range of 3T to 11T, a maximum frequency and a minimum frequency of the EFM signal can be derived in correspondence to these 3T and 11T. In other words, a frequency f3T of the data signal when the data "1" or "0" are inverted at intervals of 3T and a frequency f11T of the data signal when the data are inverted at intervals of 11T are calculated as follows:

$$f3T = 4.3218/(3 \times 2) = 720.3 \text{ [kHz]}$$

$$f11T = 4.3218/(11 \times 2) = 196.4 \text{ [kHz]}$$

On the other hand, a black dot may be assumed to have a length of 600 [μm] in the track direction of the disc 1, as a typical example. Assuming also that a read linear velocity of the disc 1 (a scanning speed of the pickup 3 with respect to the disc 1) is 1.4 [m/sec], a time tD required for a reading point of the pickup 3 to pass through the black dot is calculated as follows:

$$tD = 600/1.4 = 428.6 \text{ [}\mu\text{sec]}$$

Therefore, a frequency fBD of a component generated in the read signal due to the black dot when the black dots and non-black dot portions are alternately read at time intervals of tD is calculated as follows:

$$fBD = 1/(428.6 \times 2) = 1.17 \text{ [kHz]}$$

Consequently, the values of calculated f3T, f11T and fBD coincide with the spectrum illustrated in FIG. 3.

The frequency component generated by the black dots should not be inherently reproduced. If a read signal is reproduced without removing this frequency component, error correction must be performed many times, and high quality information cannot be reproduced either. Therefore, the HPF 5 is required to have a characteristic, as indicated by a one-dot-chain line in FIG. 3, which removes the frequency component due to the black dots, and passes only the EFM signal component. Moreover, the HPF 5 is desired to have a cut-off characteristic as steep as possible for precisely eliminating the frequency component due to the black dots.

Actually, since a so-called lower-order (first-order) HPF has a gentle cut-off characteristic, the cut-off frequency must be lowered in order for the lower-order HPF to faithfully pass the EFM signal component. However, the lower-order HPF implies a problem that the frequency component due to the black dots cannot be completely removed if the cut-off frequency is excessively lowered. Therefore, a higher-order HPF should be employed to meet the requirements mentioned above. Nevertheless, an excessively higher-order HPF, if employed, would cause a problem of increasing a so-called group delay.

Figure 4:
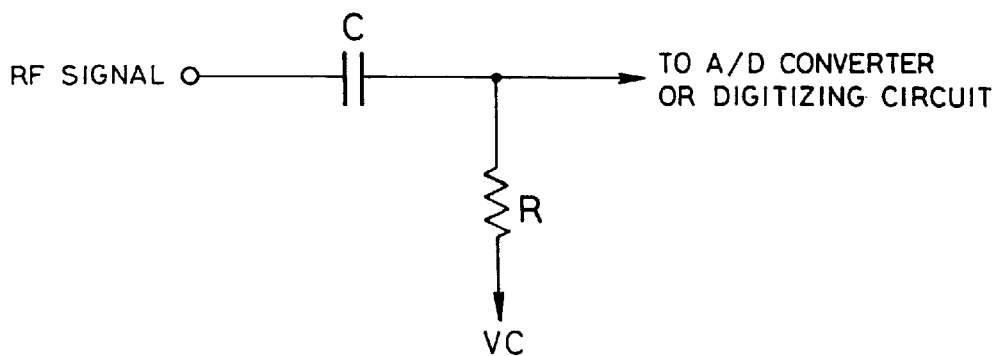
FIG. 4 is a circuit diagram illustrating a basic configuration of an exemplary first-order passive HPF for comparison with a second-order active HPF 5 according to an embodiment.
Figure 5:
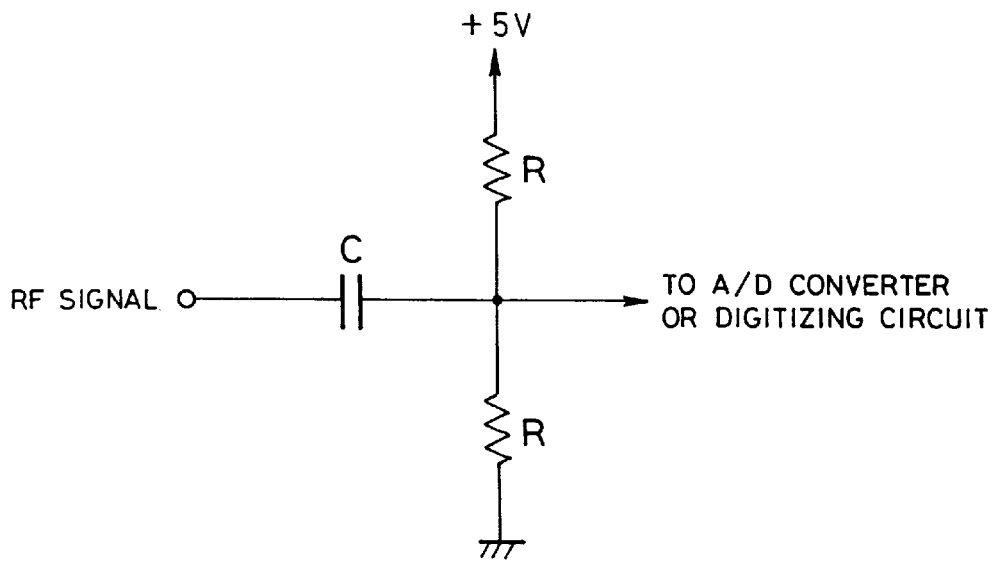
FIG. 5 is a circuit diagram illustrating a basic configuration of another exemplary first-order passive HPF for comparison with the second-order active HPF 5 according to the embodiment.
Figure 6:
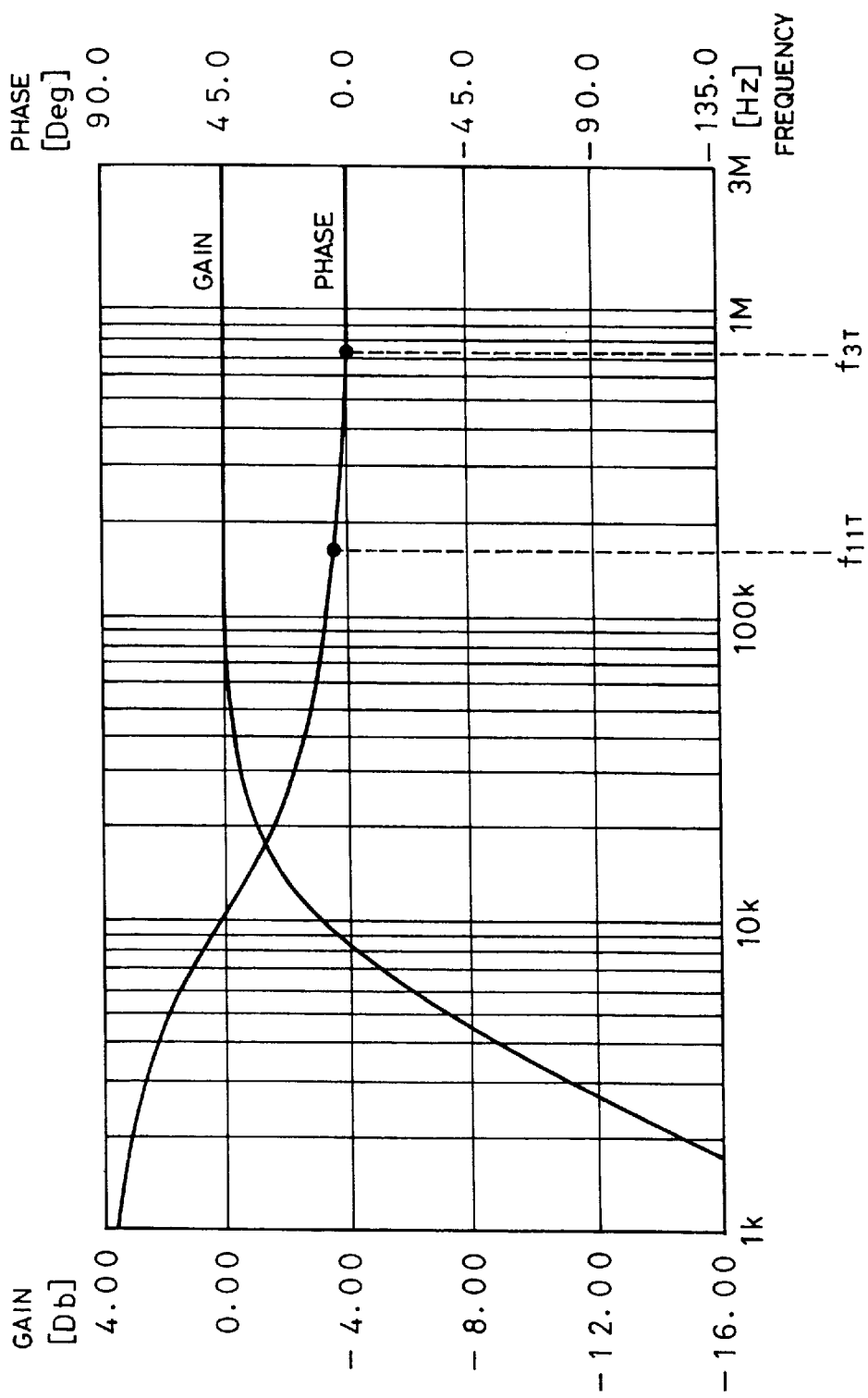
FIG. 6 is graph illustrating a gain/phase characteristic diagram of the first-order passive HPFs in FIGS. 4 and 5.

Also, as an typical example of a lower-order HPF as mentioned above, first-order passive HPFs illustrated in FIGS. 4 and 5 will have a characteristic as illustrated in FIG. 6, whereas the following consideration can be made in terms of its phase characteristic.

Specifically, the EFM signal has a bandwidth between its minimum frequency f3T and its maximum frequency f11T. In the phase characteristic of a first-order passive HPF illustrated in FIG. 6, a phase difference in this bandwidth is large. Taking a straightforward example, there is a unignorably large difference in phase between the minimum frequency f3T and the maximum frequency f11T. Then, it is considered that this large phase difference causes a read signal waveform to disturb while the read signal passes through the first-order passive HPF, causing jitter to occur.

Stated another way, it is considered that such a large phase difference is the cause of inducing much jitter in an EFM signal, when it is converted from an RF signal, i.e., a read signal from the RF amplifier 4, even if the RF signal includes little jitter. The reproducing clock for the spindle servo based on the read signal is generated from such an EFM signal or a signal equivalent thereto (in this embodiment, the output of the A/D converter), so that, as a result, a jitter component induced during the conversion to the EFM signal adversely affects the time base correction by a spindle motor by way of the reproducing clock, and also causes an unnecessary driving voltage to be supplied to the spindle motor, thus consuming a larger amount of electric power. Also, if excessively large frequency difference and phase difference are present between the reproducing clock and the reference clock when a spindle error is produced, beats are produced between these signals, and a signal processing portion (the EFM demodulator 8, and a decoder and so on at rear stages thereof) located at a rear stage for processing signals based on the synchronization signal, is burdened with a larger amount of digital processing (for example, error correction processing), resulting in a disadvantage of increasing so-called digital noise.

To solve these problems, this embodiment employs a second-order active HPF which can be set at a low cut-off frequency, has a relatively abrupt cut-off characteristic and a group delay limited within a tolerable range, and is capable of reducing a phase difference.

The values of respective components employed in the HPF 5 according to this embodiment can be selected based on the following equations.

$$Vb=V0$$

$$I1=I2+I3$$

$$(Vi-Va)/(1/SC1)=(Va-V0)/R2+(Va-V0)/(1/SC3) \quad (1)$$

$$(Va-V0)/(1/SC3)=V0/R4 \quad (2)$$

where Vb is a voltage at the non-inverting input of the operational amplifier OP1; Vi, V0 an input voltage and an output voltage of the operational amplifier OP1; I1, I2 and I3 are currents flowing into the capacitors C1, C3 and the resistor R2, respectively; Va is a voltage at a common connecting point of the capacitors C1, C3; and S=Jω.

Further, from the above equation (2), the following equations are derived:

$$SC3Va-SC3V0=V0/R4$$

$$Va=V0+V0/SC3R4 \quad (3)$$

Extending the equation (1):

$$SC1Vi-SC1Va=Va/R2-V0/R2+SC3Va-SC3V0$$

Substituting the equation (3) into the above equation:

$$SC1Vi-SC1V0-C1V0/C3R4=V0/R2+V0/SC3R2R4-V0/R2+SC3V0+V0/R4-SC3V0$$

$$SC1Vi=SC1V0+C1V0/C3R4+V0/SC3R2R4+V0/R4$$

$$V0/Vi = SC1/(SC1+C1/R4C3+1/R4+1/SC3R2R4)$$

$$= SC1/\{(S^2C1C3R2R4+SC1R2+SC3R2+1)/SC3R2R4\}$$

$$= S^2C1C3R2R4/(S^2C1C3R2R4+SC1R2+SC3R2+1)$$

$$G(S)=S^2/\{S^2+(1/C1R4+1/C3R4)S+1/C1C3R2R4\}$$

Here, the transfer function of the second-order HPF is expressed by:

$$G(S)=HS^2/(S^2+\omega S/Q+\omega^2)$$

Since the gain of the filter is chosen to be unity in this example, H is equal to one (H=1).
Therefore, $$\omega^2=1/C1C3R2R4 \quad (4)$$

$$\omega/Q=1/C1R4+1/C3R4 \quad (5)$$

Assuming C1=C3=C, the equation (5) is expressed as follows:

$$\omega/Q=1/CR4+1/CR4=2/CR4$$

$$R4=2Q/C\omega \quad (6)$$

Substituting the equation (6) into the equation (4):

$$\omega^2=1/C^2(2Q/C\omega)R2$$

$$R2=\tfrac{1}{2}CQ\omega \quad (7)$$

Assuming here that the filter has the Butterworth characteristic:

$$Q=0.7071$$

When the capacitance of C is chosen to be 0.01 [μF], the resistances of R2, R4 can be selected from a table shown in FIG. 7 corresponding to each cut-off frequency. Alternatively, the table may be used as a reference for selecting the resistance values. In the table of FIG. 7, resistance values written in parenthesis indicate those values of resistors which can be actually employed as parts of the HPF 5. Also, f' indicates a cut-off frequency provided when those actual resistance values are employed.

In this embodiment, the selection of appropriate values for the resistors used in the HPF 5 from the table of FIG. 7 is based on the following trial calculation results.

Figure 8:
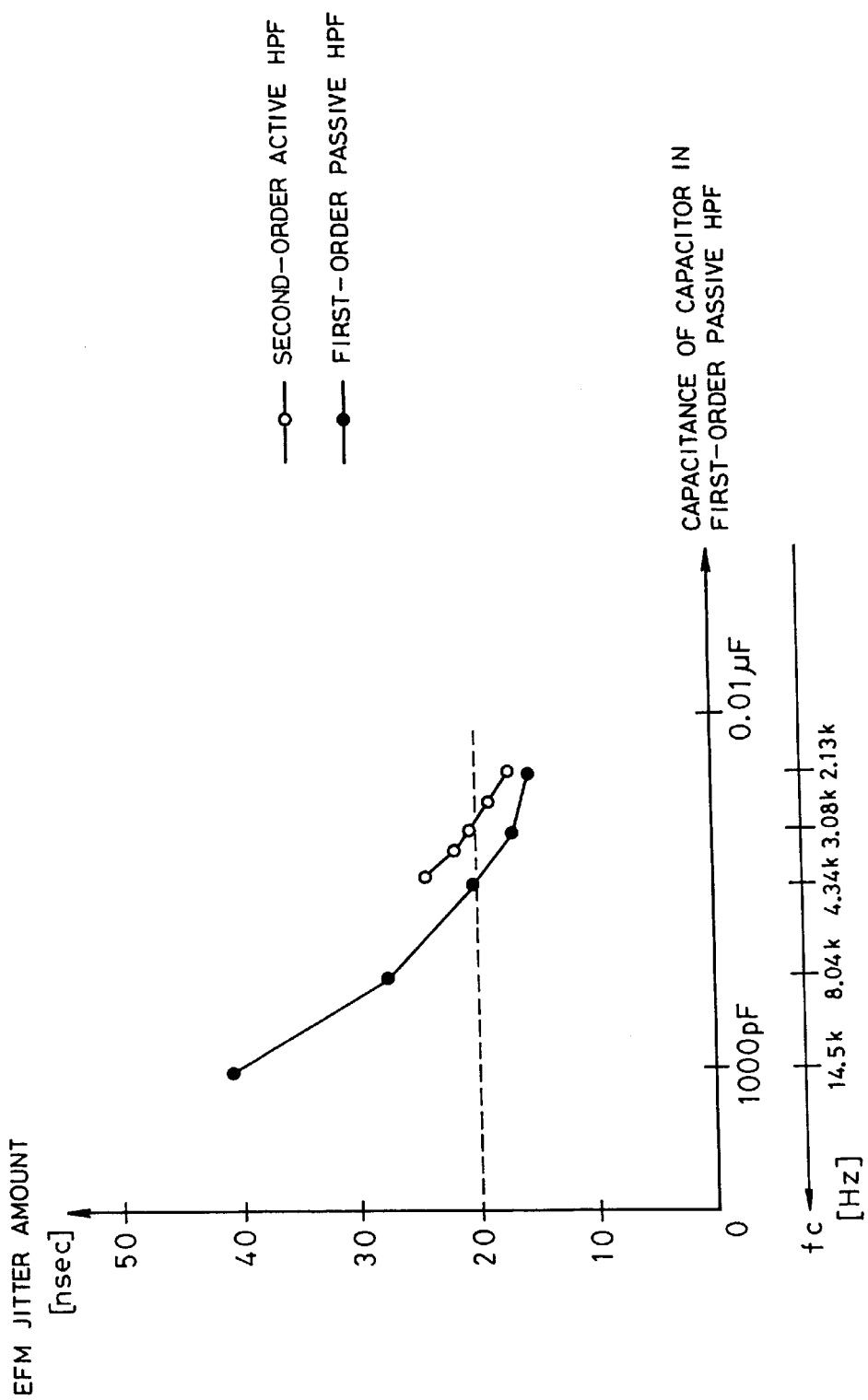
FIG. 8 is a characteristic diagram of the cut-off frequency versus the EFM jitter amount for the second-order active HPF according to the embodiment and the first-order passive HPFs in FIGS. 4 and 5.

First, FIG. 8 illustrates the characteristic of an EFM jitter amount versus the cut-off frequency fc. According to this graph, it can be seen that the second-order active HPF 5 of this embodiment has such a characteristic that an EFM jitter amount of approximately 20 [nsec] is present at the cut-off frequency fc ranging from 4.34 to 2.13 [kHz]. It can be also seen that the EFM jitter amount is increased as the cut-off frequency is higher. It should be noted that the EFM jitter amount indicates an offset amount of an EFM signal output from the Viterbi decoder 7 illustrated in FIG. 1 on the time base, and is therefore expressed in times.

FIG. 8 also illustrates the characteristic of the first-order passive HPFs configured as illustrated in FIGS. 4 and 5 which have been previously described for comparison with the second-order active HPF of this embodiment. The upper abscissa in FIG. 8 represents the capacitance of a capacitor used in the first-order passive HPF. It can be seen that as the capacitance is reduced more, the cut-off frequency becomes correspondingly higher.

Figure 9:
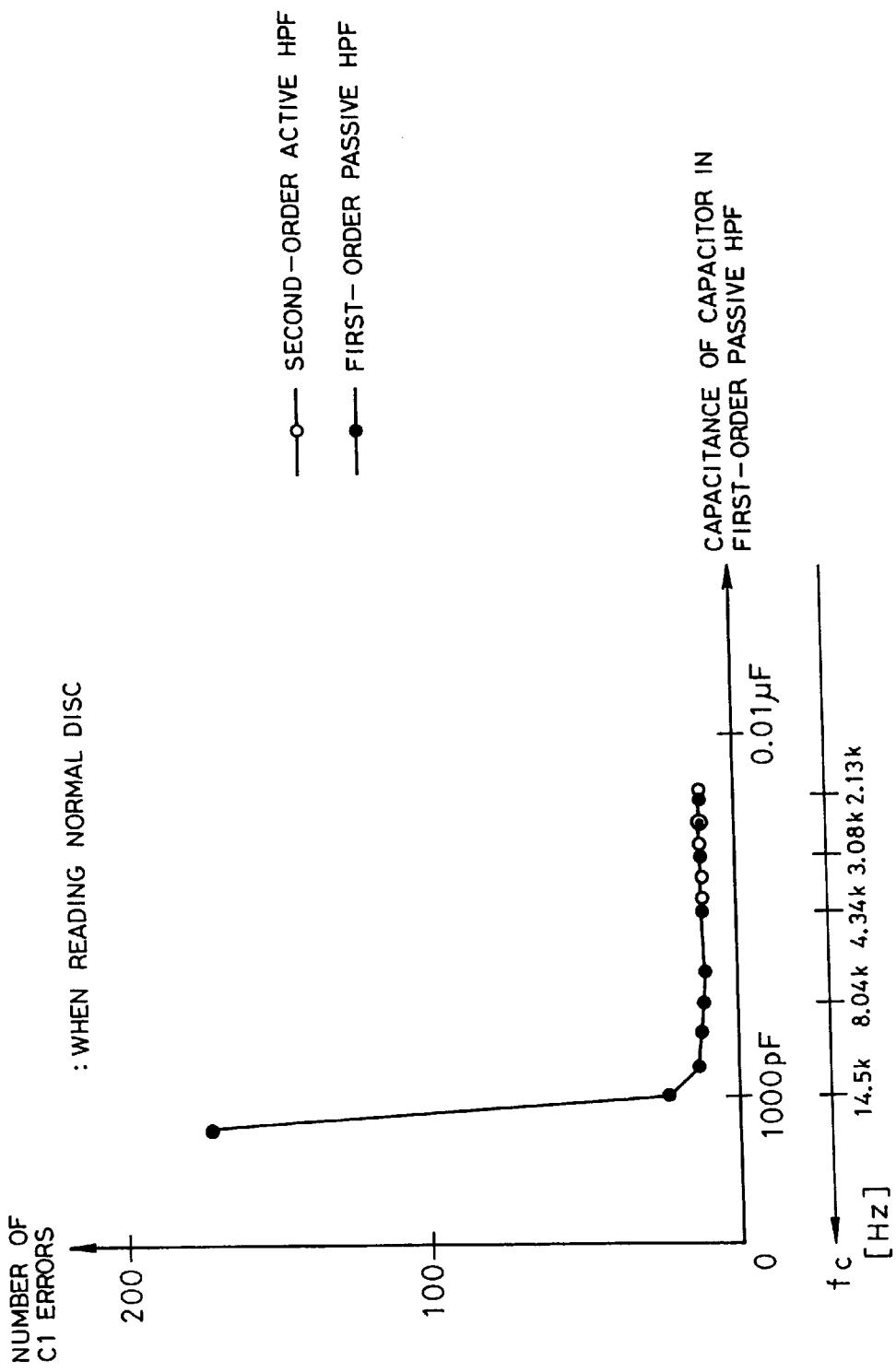
FIG. 9 is a characteristic diagram of the cut-off frequency versus the number of C1 errors found during a read from a normal disc, for the second-order active HPF 5 according to the embodiment and the first-order passive HPFs in FIGS. 4 and 5.

FIG. 9 in turn illustrates the characteristic of the number of C1 errors versus the cut-off frequency fc. According to this graph, it can be seen that the second-order active HPF 5 of this embodiment has such a characteristic that the number of C1 errors is already stabilized in the cut-off frequency fc range from 4.3 to 3.13 [kHz] and is limited within a small number. It can be also seen that the first-order passive HPF, selected for comparison, has such a characteristic that the number of C1 errors is stabilized in a cut-off frequency fc range above 14.5 [kHz] and limited within a small number, similarly to the HPF 5. The C1 error refers to an error generated by an error correcting code C1 included in CIRC (Cross Interleave Reed-Solomon Code) used for error correction processing in CD, and the number of C1 errors indicates the number of C1 errors generated when a predetermined number of frames in accordance with a so-called CD format (here, corresponds to 75,000 frames or an audio output of approximately ten seconds) are processed for reproduction. Also, FIG. 9 illustrates the characteristics of the HPFs derived when a normal disc free of black dots is read.

Figure 10:
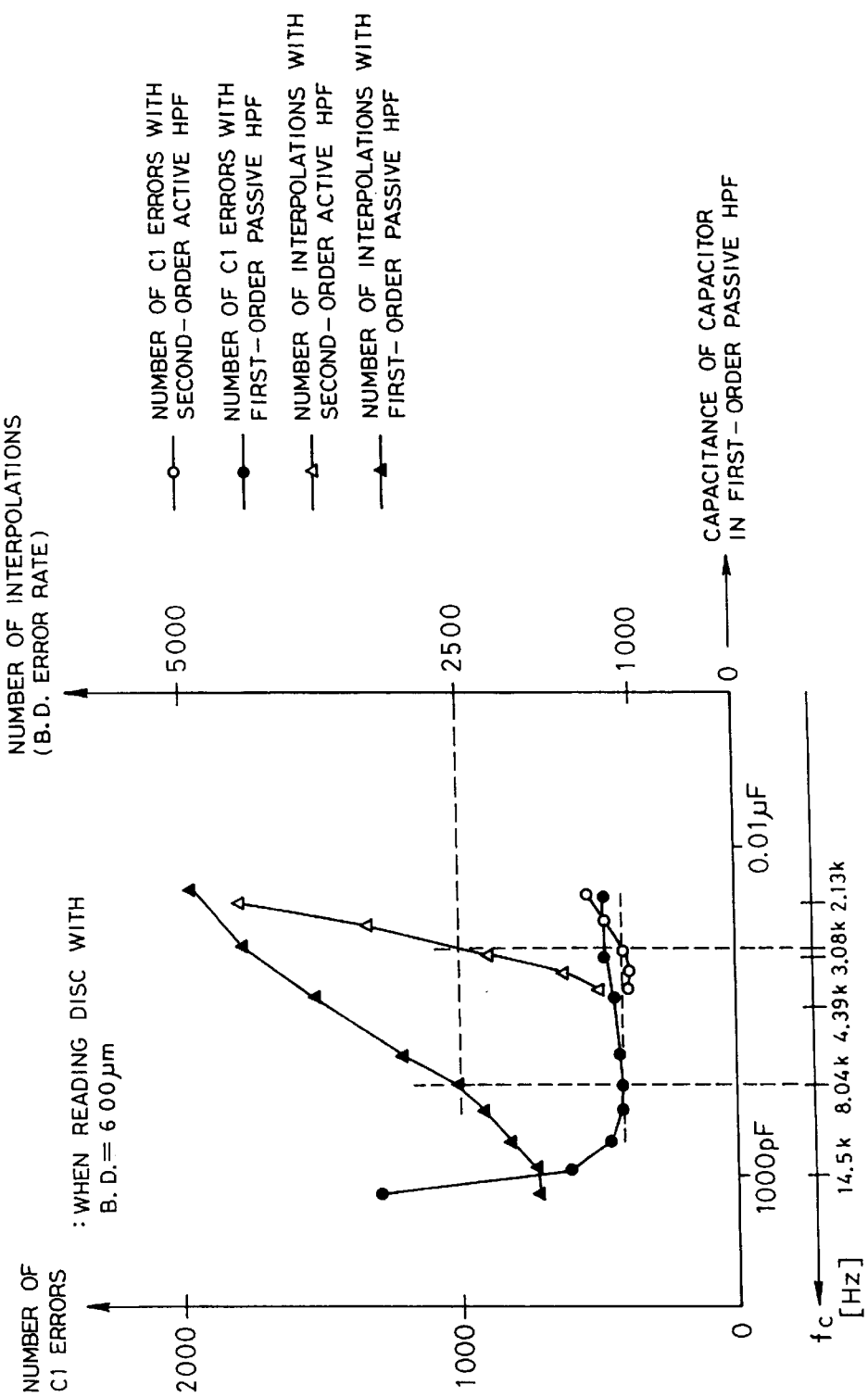
FIG. 10 is a characteristic diagram of the cut-off frequency versus the number of C1 errors and a black dot error rate during a read from a disc on which black dots of 600 [mm] in length are formed, for the second-order active HPF 5 according to the embodiment and the first-order passive HPFs in FIGS. 4 and 5.

FIG. 10 illustrates a graph of the number of C1 errors and a black dot (B. D.) error rate versus the cut-off frequency fc derived when reading a disc on which black dots of 600 [μm] in length exist in the track direction of the disc. Here, the B. D. error rate corresponds to the number of frames in information signal data corrected due to the black dots during the error correction processing, when a predetermined number of frames (here, 75,000 frames) of a read signal in the CD format are processed for reproduction. According to the graph of FIG. 10, it can be seen with respect to the number of C1 errors that the first-order passive HPF as well as the second-order active HPF exhibit the numbers of C1 errors which are stabilized in a cut-off frequency fc range above approximately 14.5 (fc>14.5) [kHz], as is the case of FIG. 9 where a normal disc is read, and that the numbers of C1 errors are stabilized at a value (1,000) much larger than that observed when a normal disc is read. Also, while the first-order passive HPF as well as the second-order active HPF exhibit lower B. D. error rates as the cut-off frequency is higher, the second-order active HPF in particular presents a significant decrease in the B. D. error rate as the cut-off frequency becomes higher, as compared with that of the first-order passive HPF.

Figure 11:
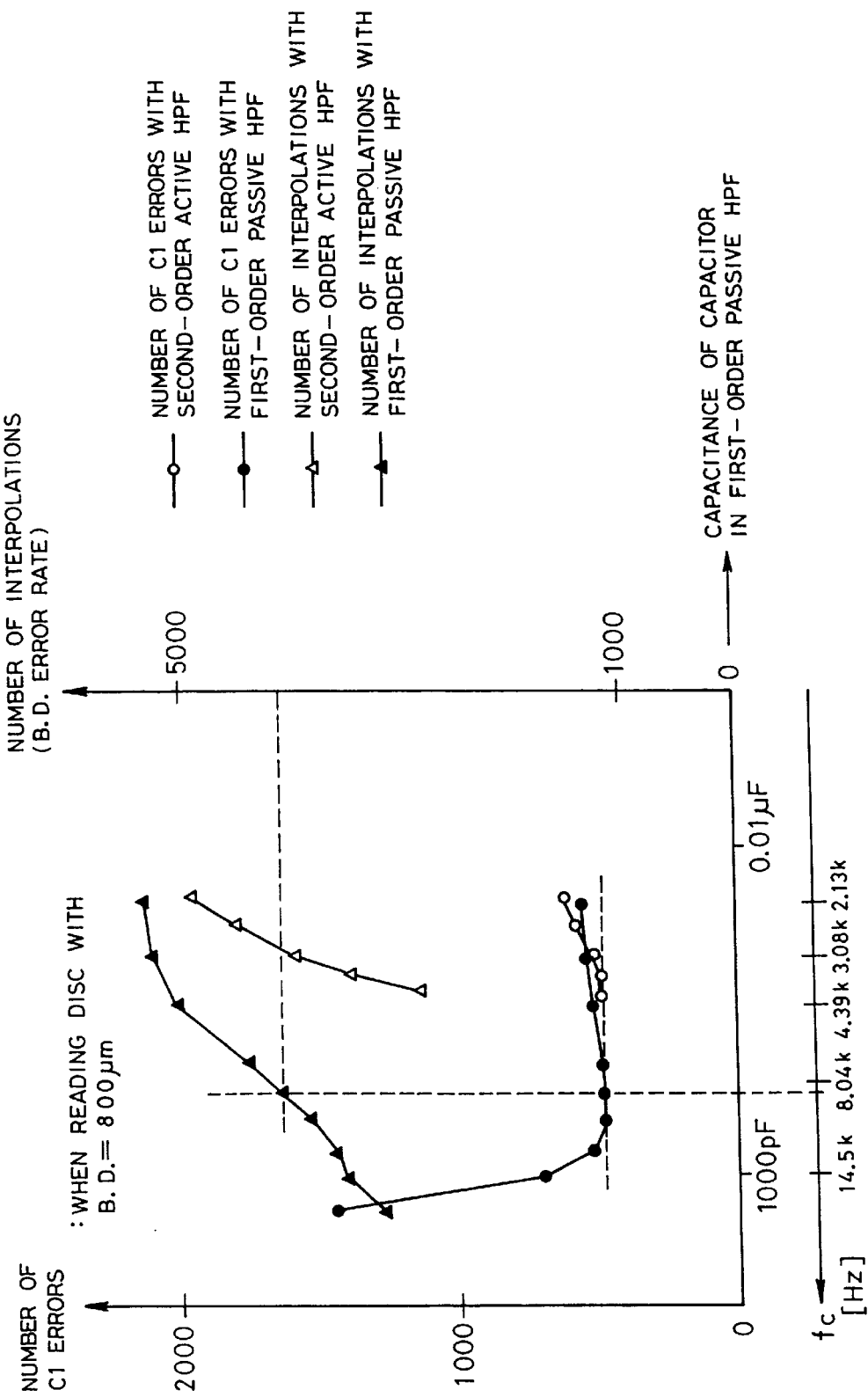
FIG. 11 is a characteristic diagram of the cut-off frequency versus the number of C1 errors and a black dot error rate during a read from a disc on which black dots of 800 [$\mu$m] in length is formed, for the second-order active HPF 5 according to the embodiment and the first-order passive HPFs in FIGS. 4 and 5.

FIG. 11 illustrates a graph of the number of C1 errors and a B. D. error rate versus the cut-off frequency derived when reading a disc on which black dots of 800 [μm] in length, longer than that of FIG. 10, exist in the track direction of the disc. In comparison with the graph of FIG. 10, it can be seen that the characteristic curves representing the numbers of C1 errors and the B. D. errors are shifted generally in a direction in which the error rate is deteriorated for both of the first-order passive HPF and the second-order active HPF.

Considering collectively the characteristics illustrated in FIGS. 8–11, the first-order passive HPF exhibits a reduced EFM jitter amount and a reduced number of C1 errors as a capacitor of a larger capacitance is employed to lower the cut-off frequency (see FIGS. 8 and 9), whereas the first-order passive HPF exhibits a deteriorated B. D. error rate if the cut-off frequency is too low (see FIGS. 10 and 11). On the other hand, the second-order active HPF, while generally having a similar tendency to the first-order passive HPF, exhibits a relatively low B. D. error rate even at a rather low cut-off frequency.

Specifically, when reading a disc on which black dots of 600 [μm] in length are formed, as illustrated in FIG. 10, the first-order passive HPF involves the number of interpolations of the black dots exceeding 2,500 in a cut-off frequency range below 8.04 [kHz], while the second-active HPF involves the number of interpolations of the black dots less than 2,500 even at the cut-off frequency as low as 3 [kHz]. When reading a disc on which black dots of 800 [μm] in length are formed, as illustrated in FIG. 11, the first-order passive HPF involves the number of interpolations of black dots exceeding 4,000 in the cut-off frequency range below 8.04 [kHz], while the second-order active HPF involves the number of interpolations of the black dots less than 4,000 even at the cut-off frequency as low as 3 [kHz].

As described above, the second-order active HPF according to this embodiment is capable of lowering the cut-off frequency while maintaining a low B. D. error rate.

For selecting specific resistance values for use in the HPF 5, the EFM jitter amount equal to 200 [nsec] is defined as a target value based on the characteristic illustrated in FIG. 8. From this definition, the cut-off frequency fc is determined to be at approximately 3 [kHz] or less. In a band above this approximately 3 [kHz], good results equivalent to or superior to the first-order passive HPF can be confirmed in the characteristics illustrated in FIGS. 9–11. However, in consideration of playability against the black dots, the number of interpolations due to the black dots is required to be substantially 2,500 or less when reading a disc on which black dots of 600 [μm] in length are formed, as illustrated in FIG. 10. Therefore, it amounts to that the cut-off frequency is desirably set near 3 [kHz].

Figure 12:
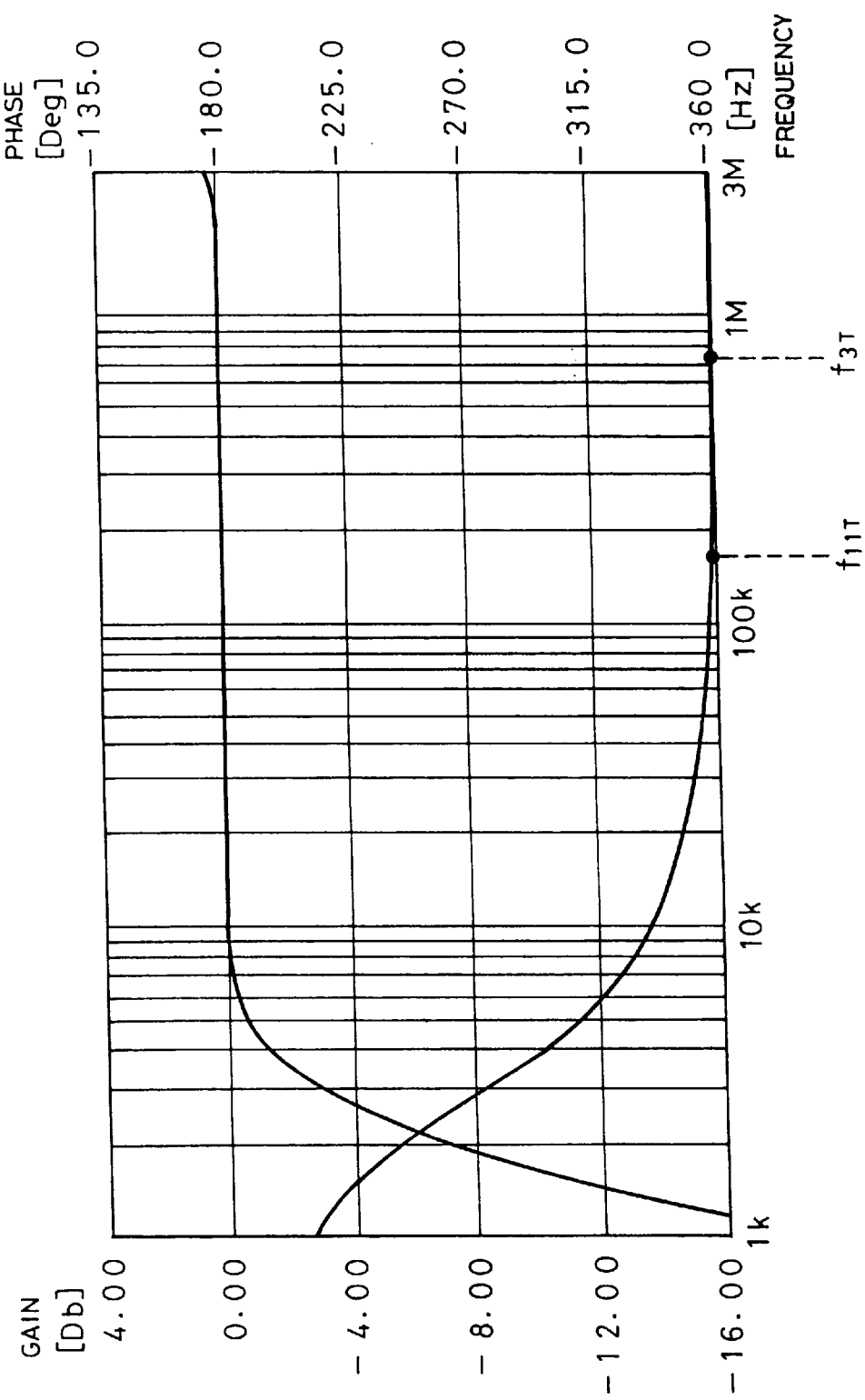
FIG. 12 is a gain/phase characteristic diagram for the second-order active HPF 5 according to the embodiment.

Further, when the second-order active HPF 5 is configured with the cut-off frequency set at 3 [kHz], its gain/phase characteristic is as illustrated in FIG. 12. According to this graph, the difference in phase between the minimum frequency f3T and the maximum frequency f11T is reduced in the extreme, so that it can be said that this second-order active HPF 5 exhibits substantially an ideal characteristic, as compared with FIG. 6. It is therefore possible to eliminate the aforementioned problem that much jitter is induced in an EFM signal when it is converted from a read signal, even if the read signal includes little jitter.

Consequently, the resistor R2 and the resistor R4, constituting the HPF 5, are set at 3.9 [kΩ] and 7.5 [kΩ], respectively, as additionally written in FIG. 2, based on the list of FIG. 7 showing the values of the resistors corresponding to the cut-off frequency fc.

Figure 13:
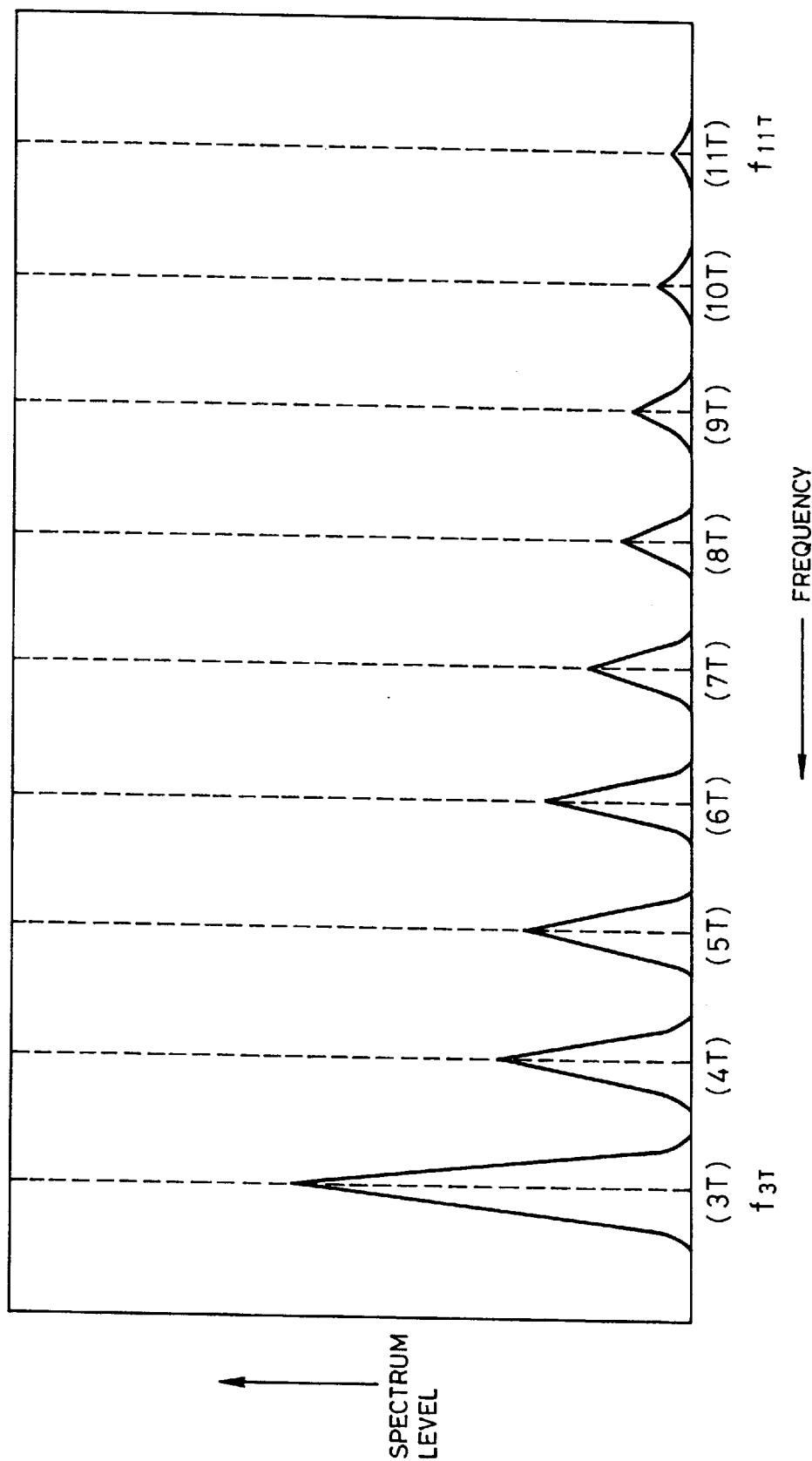
FIG. 13 is a spectrum diagram of respective data signals having different inversion periods in an EFM signal, derived when the first-order passive HPF in FIG. 4
Figure 14:
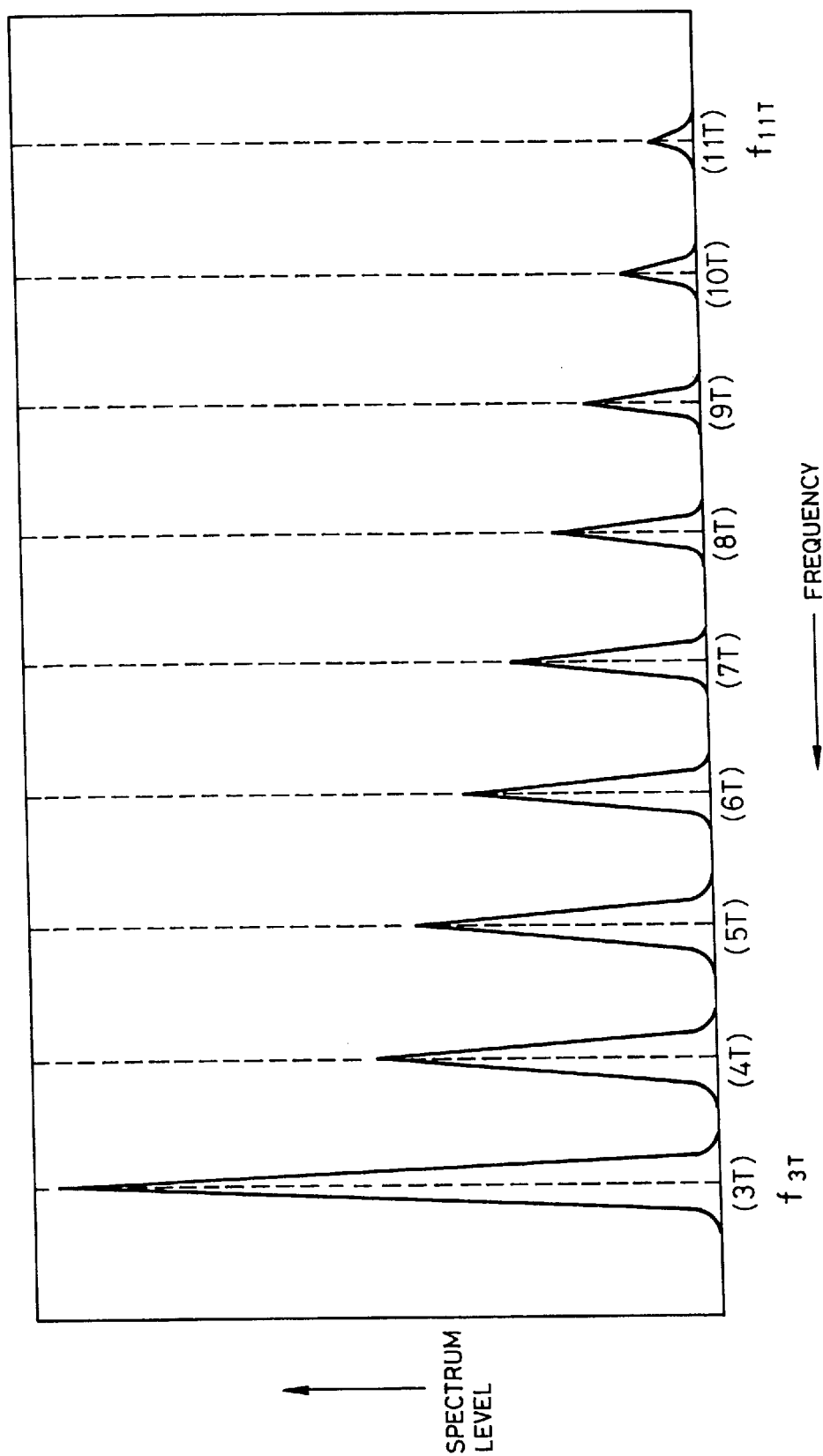
FIG. 14 is a spectrum diagram of respective data signals having different inversion periods in an EFM signal, derived when a second-order active HPF according to an embodiment is used.

For analyzing the EFM jitter from another aspect, FIGS. 13 and 14 illustrate the spectra of data signals composed in EFM signals with different inversion periods (3T–11T). FIG. 13 illustrates a spectrum diagram derived when the first-order passive HPF is used, while FIG. 14 illustrates a spectrum diagram derived when the second-order active HPF 5 according to this embodiment is used.

As can be seen from these diagrams, when the first-order passive HPF is used, the spectra of respective data signals are uniformly wide and exhibit low levels. In other words, the sideband is extended from the reference frequency of each data signal, and the data signals are transmitted with fluctuations on the time base. On the other hand, when the second-order active HPF 5 of this embodiment is used, the spectra of respective data signals are uniformly thin, and exhibit high levels. In other words, each data signal is concentrated at the reference frequency thereof, and is transmitted with less fluctuations on the time base.

By employing the HPF 5 of this embodiment configured as described above, the following effects are found in the quality of reproduced sound as reproduced information. First, the resolution is improved in a lower range. Second, the modulation is increased in the lower range. As a total effect, a clear sound image emerges, and from the view point of audibility, the sense of stability is increased for sound, particularly, so-called musical sound.

Next, the configuration of the driving circuit 20, which implements one of other principle features in this embodiment, will be described with reference to FIG. 15.

Figure 15:
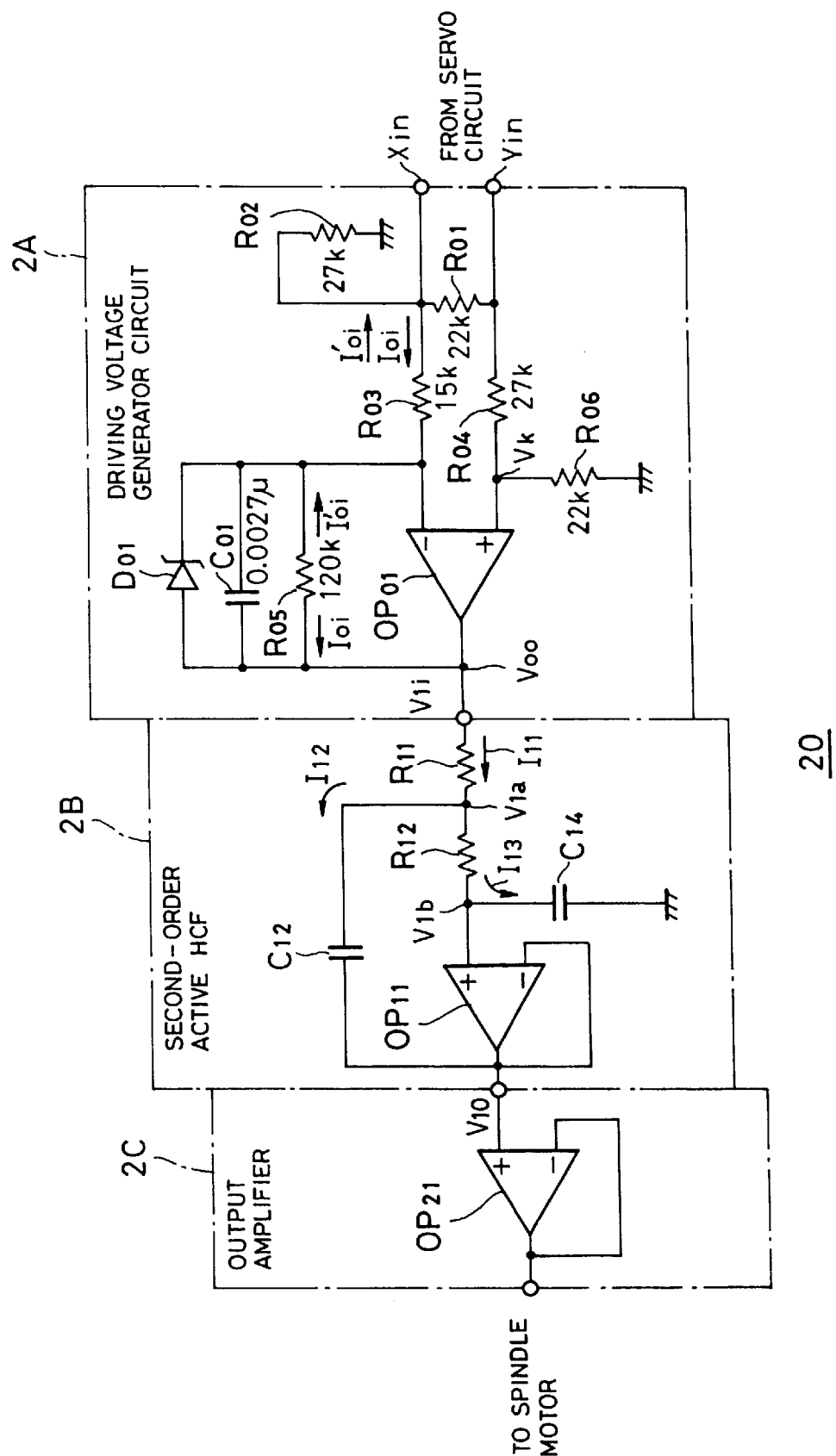
FIG. 15 is a circuit diagram illustrating a basic configuration of a driving circuit 20 in the player of FIG. 1.

FIG. 15 illustrates a basic configuration of the driving circuit 20. The driving circuit 20 is generally composed of a first-stage driving voltage generating circuit 2A, a second-order high cut filter (HCF) 2B, and an output amplifier 2C. The driving voltage generating circuit 2A, which has two input terminals Xin and Yin, operates in response to control signals supplied to the respective input terminals from the servo circuit 18 (see FIG. 1). One of the input terminals Xin is grounded through a resistor R02, and connected to an inverting input terminal of an operational amplifier OP01 through a resistor R03, while the other input terminal Yin is connected to an non-inverting terminal of the operational amplifier OP01 through a resistor R04. In addition, a resistor R01 is connected between the input terminals Xin, Yin.

A parallel connection circuit including a diode D01, a capacitor c01 and a resistor R05 is formed between an output terminal and the inverting input terminal of the operational amplifier OP01. More specifically, a cathode of the diode D01, one end of the capacitor C01 and one end of the resistor R05 are connected to the inverting input terminal of the operational amplifier OP01, while an anode of the diode D01, the other end of the capacitor C01 and the other end of the resistor R05 are connected to the output terminal of the operational amplifier OP01. The non-inverting input terminal of the operational amplifier OP01 is grounded through a resistor R06.

A first control signal Sx supplied from the servo circuit 18 to the input terminal Xin, and a second control signal Sy supplied to the input terminal Yin from the same exhibit levels as indicated in a table of FIG. 16, corresponding to states in which the spindle motor 2 should be driven. In the table, "H" and "L" indicate that the control signal is at high level and at low level, respectively, and "Z" indicates that the control signal line is brought into a high impedance state, i.e., at a so-called floating level.

As can be understood from the table of FIG. 16, the servo circuit 18 controls the first and second control signals Sx, Sy in the following manner based on an error signal from the phase comparator 12. When determining that the rotational speed of the servo motor 2 is lower than a defined speed, the servo circuit 18 sets both the first and second control signals Sx, Sy to high level (for example, +5 [V]) for a time period corresponding to the magnitude of the difference between the two speeds. Conversely, when determining that the rotational speed of the servo motor 2 is higher than the defined speed, the servo circuit 18 sets only the first control signal Sx to low level for a time period corresponding to the magnitude of the difference between the two speeds. Also, when a motor stop instruction is issued from the system controller 17, the servo circuit 18 sets the first and second control signals Sx, Sy to floating level and low level, respectively.

For stopping the motor, both input terminals of the operational amplifier OP01 are at 0 [V], and a voltage V00 at the output terminal of the same is at 0 [V].

When the motor is accelerated (kicked), the operational amplifier OP01 forms an inverting amplifier. The output voltage V00 in this event is calculated from:

$$Vk = 5[V] \times 22[k\Omega] / (22[k\Omega] + 27[k\Omega])$$
$$= 2.24[V]; \text{ and}$$
$$Ioi = (5[V] - 2.24[V]) / 15[k\Omega]$$
$$= 184[\mu A],$$

and therefore:

$$V00 = 2.24[V] - 120[k\Omega] \times 184[\mu A]$$
$$= -19.84[V]$$

However, since the zener diode D01 exerts a zener effect on the output voltage V00:

$$V00 = 2.24[V] - 6.8[V]$$
$$= -4.56[V]$$

When the motor is decelerated (braked), the operational amplifier OP01 forms a non-inverting amplifier, in which case the output voltage V00 is calculated from:

$$Vk = 5[V] \times 22[k\Omega] / (22[k\Omega] + 27[k\Omega])$$
$$= 2.24[V]; \text{ and}$$
$$IOi = 2.24[V] / 15[k\Omega]$$
$$= 149[\mu A],$$

and therefore:

$$V00 = 2.24[V] + 120[k\Omega] \times 149[\mu A]$$
$$= 20.12[V]$$

However, due to a forward characteristic of the zener diode D01:

$$V00 = 2.24[V] + 0.6[V]$$
$$= 2.84[V]$$

As described above, the driving voltage generating circuit 2A is responsive to a spindle error to generate a driving voltage of negative polarity when the spindle motor 2 is accelerated, and to generate a driving voltage of positive polarity when the spindle motor is decelerated. Therefore, when the spindle motor 2 is held within a certain rotational speed range with the spindle servo being locked in, the driving voltages of different polarities are alternately switched at short time intervals, thus supplying discontinuous driving voltages.

Figure 17:
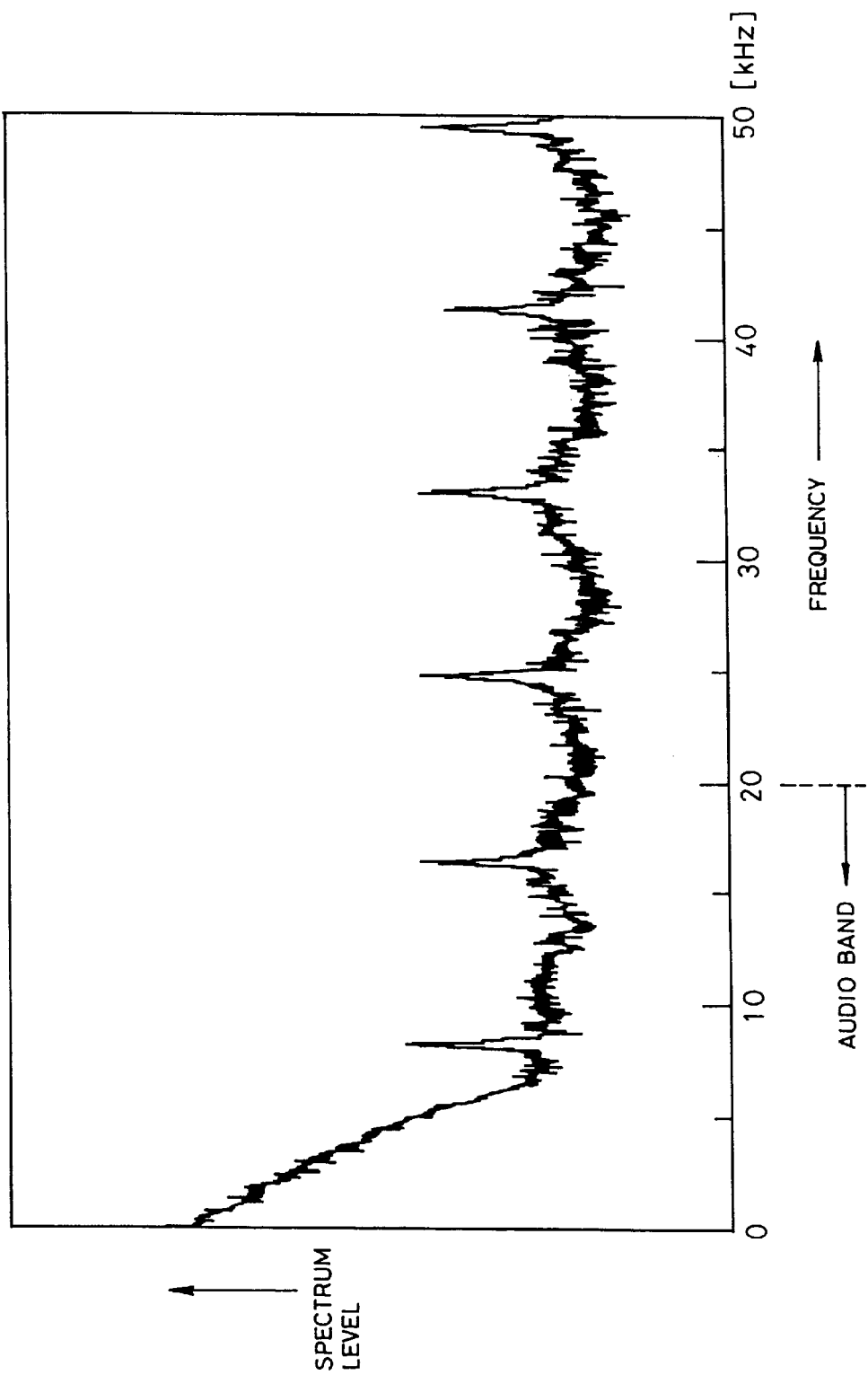
FIG. 17 is a spectrum diagram illustrating frequency components of an output signal of a driving voltage generating circuit 2A in FIG. 15.

The current spectrum of an output signal from the driving voltage generating circuit 2A is illustrated in FIG. 17. It can be seen from this spectrum diagram that harmonic components at extremely high level periodically exist within an audio (audible frequency) band (for example, in a range of 20 [Hz]–20 [kHz]). It is also considered that driving voltages of different polarities, as mentioned above, alternately switched at short time intervals to be discontinuous is one of causes of generating such harmonic components.

Generally, a direct-current driving type motor is employed for the spindle motor 2, so that a high frequency current including these harmonic components are not necessary for the rotation of the spindle motor 2. Conventionally, however, such an output signal has been supplied as it is to the spindle motor 2 on the assumption that components other than a direct-current component (0 [Hz]) do not inherently affect the driving of the motor because the spindle motor 2 is of a direct-current driving type. The consideration made by the present inventors has revealed that these harmonic components are one of causes of Jitters occurring in a signal read from a disc.

Thus, in this embodiment, a second-order active HCF 2B is employed for removing harmonic components as mentioned above from the output signal of the driving voltage generating circuit 2A, thereby preventing an unnecessary current from being supplied to the spindle motor 2.

The second-order active HCF 2B has a resistor R11 which receives at one end thereof the output signal from the driving voltage generating circuit 2A, with the other end of the resistor R11 being connected to the non-inverting input terminal of an operational amplifier OP11 through a resistor R12. Between a connecting point of the resistor R11 and the resistor R12 and an output terminal of the operational amplifier OP11, a capacitor C12 is connected to form a feedback loop. Also, a capacitor C14 is connected between a non-inverting input terminal of the operational amplifier OP11 and a ground point, and an inverting input terminal of the operational amplifier OP11 is connected to the output terminal thereof as well as is lead out as a filter output which is supplied to an output amplifier 2C comprising an operational amplifier OP21. The output of the output amplifier 2C is lead to a driving voltage input terminal of the spindle motor 2.

The values of the respective resistors and capacitors used in the second-order active HCF 2B can be set in the following manner.

$$V1b=V10$$

$$I11=I12+I13$$

$$(V1i-V1a)/R11=(V1a-V10)/(b\ 1/SC12)+(V1a-V10)/R12 \quad (11)$$

$$(V1a-V10)/R12=V10)/(1/SC14) \quad (12)$$

where V1b is a voltage at the non-inverting input of the operational amplifier OP11; V1i, V10 are input and output voltages of the operational amplifier OP11; I11, I12 and I13 are currents flowing into the resistor R11 and the capacitors C12, C14, respectively; V1a is a voltage at a common connecting point of the resistors R11, R12; and $S=j\omega$.

Further, from the equation (12):

$$V1a/R12-V10/R12=SC14V10$$

$$V1a=(1+SC14R13)V10 \quad (13)$$

is derived.

Substituting the equation (13) into the equation (11):

$$V1i/V11-V10/R11-SC14R13V10/R11=SC12V10+$$
$$S^2C12C14R12V10-SC12V10+V10/R12+SC14V10-V10/R12$$

$$V1i/R11=\{S^2C12C14R12+S(C14R12/R11+C12-C12+C14)+1/R11\}V10$$

$$V10/V1i=(1/R11)$$

$$x[1/\{S^2C12C14R12+S(C14R12/R11+C14)+1/R11\}]=1/\{S^2C12C14R11R12+S(C14R12+C14R11)+1\}$$

$$G(S)=V10/V1i=(1R11R12C12C14)/\{S^2+(1/C1R14+1/C12R13)S+1/R11R12C12C14\}$$

Here, the transfer function of the second-order HPF is expressed by:

$$G(S)=H\omega^2/(S^2+\omega S/Q+\omega^2)$$

In this example, since the gain of the filter is set to one, H is equal to one (H=1). Also, when the filter is set to the Butterworth characteristic:

$$G=\omega^2/(S^2+\omega S/0.7071+\omega^2)$$

Therefore:

$$\omega/0.7071=1//R11C12+1/R12C12 \quad (14)$$

$$\omega^2 1/R11R12C12C14 \quad (15)$$

When the cut-off frequency fc is set at 500 [Hz], $$\omega=2\times\pi\times500=3141.6$$

Assuming R11=R12=R, from the equation (14):

$$3141.6/0.7071=2/RC12$$

$$C12=0.7071\times 2/(3141.6\times R) \quad (16)$$

From the equation (15):

$$(3141.6)^2=1/R^2C12C14$$

$$C14=1/\{3141.6)^2R^2C12\} \quad (17)$$

Substituting the equation (17) into the equation (16):

$$C14 = [1/(3141.6^2 R^2]\times\{(3141.6\times R)/(0.7071\times 2)\}$$
$$= 1/(2\times 3141.6\times 0.7071\times R)$$

When R=100 [kΩ]:

$$C12=0.00450\ [\mu F](\rightarrow 4700\ [pF])$$

$$C14=0.00225\ [\mu F](\rightarrow 2200\ [pF])$$

It should be noted that the values in parenthesis are actually employed values, so that an actually derived cut-off frequency fc' is calculated, when based on these actual values, as follows:

$$fc' = 1/\{2\times\pi\times(100[k\Omega]^2\times 4700[pF]\times 2200[pF]^{1/2}\}$$
$$= 495[Hz]$$

Figure 18:
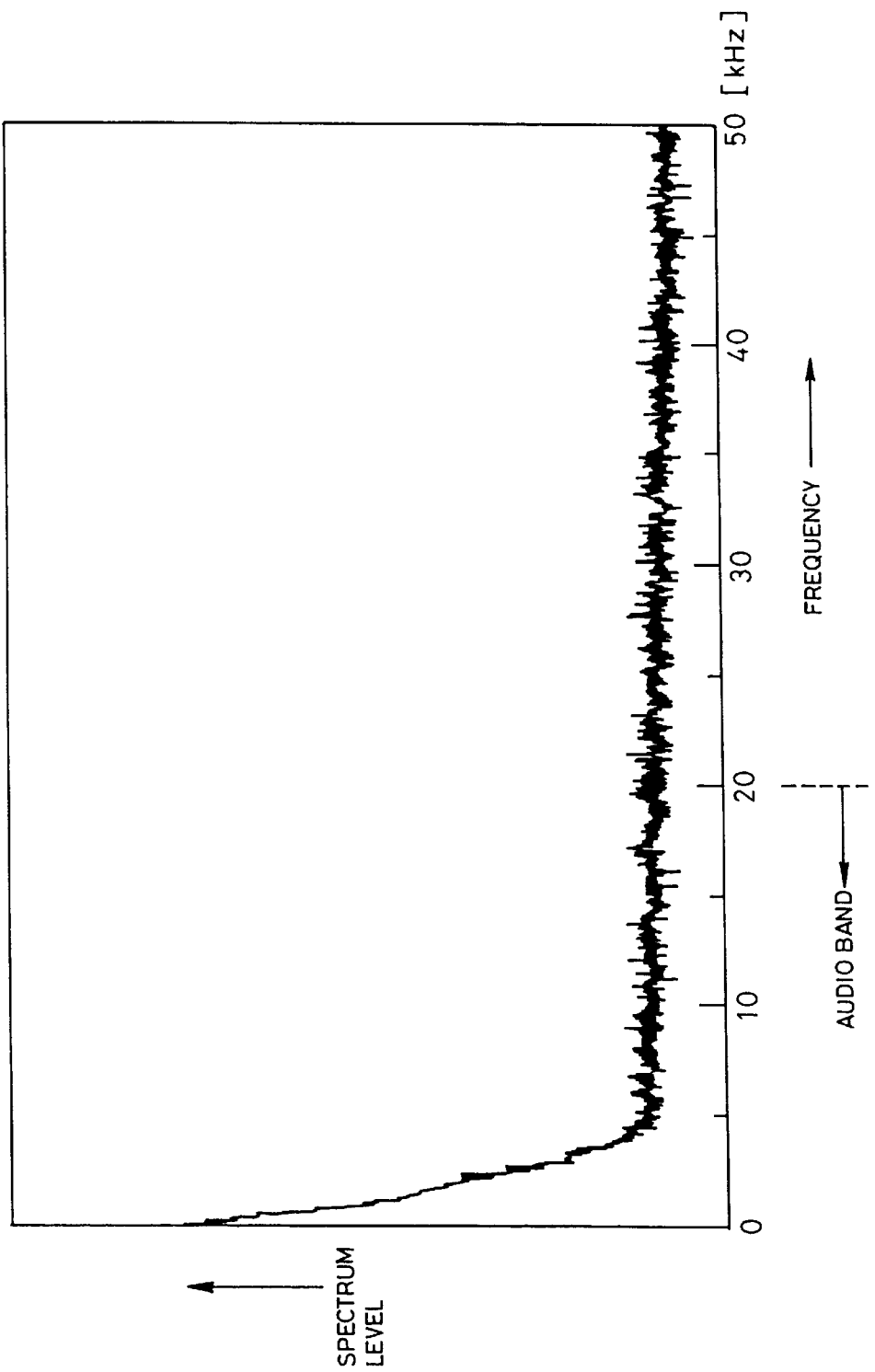
FIG. 18 is a spectrum diagram illustrating frequency components of a spindle motor driving signal having harmonic components removed by a second-order active HCF 2B in FIG. 15.
Figure 19:
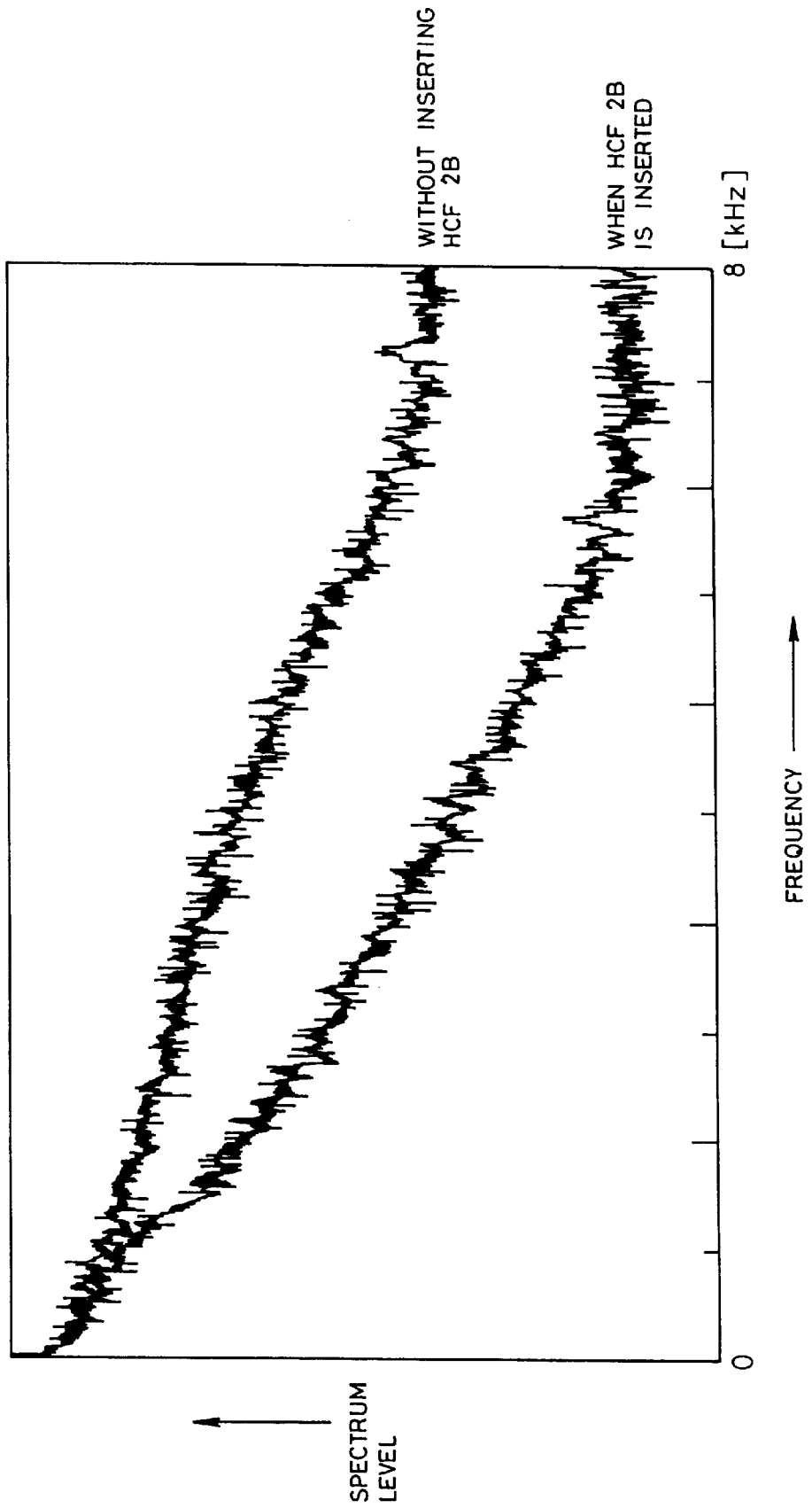
FIG. 19 is an enlarged spectrum diagram illustrating frequency components in a low frequency range of the spindle motor driving signal when the second-order active HCF 2B in FIG. 15 is used and is not used.

According to the HCF 2B having the values set in the foregoing manner, a driving current having a current spectrum illustrated in FIG. 18 is generated from the output of the output amplifier 2C. As can be seen from FIG. 18, not only the harmonic components in the audio band, pointed out in FIG. 17, but also any other unnecessary harmonic components are removed, and the high frequency band is entirely restrained to a low level. Since the spindle motor 2 is not supplied with any unnecessary current, a favorable spindle servo can be applied, thereby making it possible to remove a jitter component from a read signal. This also contributes to a reduction in power consumption. FIG. 19 illustrates in enlarged view the current spectra of the driving signals up to 8 [kHz] when the HCF 2B is used and when it is not used. It can be seen from FIG. 19 that the use of the HCF 2B according to this embodiment also reduces components in a so-called low frequency band other than the direct-current component.

By using the HCF 2B of this embodiment configured as described above, the following effects are found in the quality of reproduced sound as reproduced information. First, the S/N ratio is improved from a middle range to a high range of the reproduced sound. Second, the presence is enhanced.

While the foregoing description has been made separately on the HPF 5 provided in the read signal processing system and the HCF 2B provided in the spindle motor driving system, a disc player is desirably configured using these two filters in order to most effectively solve the principle problem of the present invention, i.e., achieve the removal of jitter in a read signal. More specifically, the HPF 5 is intended to locally suppress jitter possibly produced when an RF signal is converted to an EFM signal, while the HCF 2B is intended to locally suppress jitter possibly produced when a driving voltage is supplied to the spindle motor. However, the conversion of an RF signal to an EFM signal is closely related to a reproducing clock (the clock output from the PLL circuit 9 in this example) which is the basis of the generation of the driving voltage for the spindle motor. Conversely, the supply of the driving current to the spindle motor is likewise closely related to the RF signal, strongly affected by a disc rotating condition, which is converted to an EFM signal. It is therefore preferred to provide the two filters in a player because synergistic actions are expected therefrom.

However, since significant effects can be produced only by providing either of the filters singularly in a player, such a configuration as including only one of the two filters is not eliminated.

While in the foregoing embodiment, the present invention is applied to a CD player, the present invention may also be applied to an apparatus for reading recorded information on a DVD (Digital Video Disc) or any optical disc other than a CD. Therefore, a signal to be converted from a read signal should not be limited to the EFM signal, but any predetermined encoded signal in accordance with the DVD standard, such as an 8/16 modulated signal can be benefitted from the present invention.

Also, while the foregoing embodiment has been described in connection with a system using a Viterbi decoder as the one designated by 7, the present invention may also be applied to a system which does not use such a decoder but directly generates an EFM signal using a so-called digitizing circuit.

Further, while in the foregoing embodiment, the reproducing clock is generated based on the output of the A/D converter 6, the reproducing clock may be generated from the output of the Viterbi decoder and used as the basis of the spindle servo.

Further, while the analog HPF 5 is positioned at the rear stage of the RF amplifier 4 in the reading signal processing system of the foregoing embodiment, a digital HPF having substantially equivalent characteristics to the HPF 5 may be provided at the rear stage of the output of the A/D converter 6. In essence, in the processing in the digital converting means for generating an encoded signal prior to outputting the encoded signal, a signal processing means may be provided for removing low frequency noise components from a broad read signal without causing distortions in the direction of the time base so as to produce similar meritorious effects to those of the foregoing embodiment.

Further, in the foregoing embodiment, the noise components caused by black dots is given as unnecessary low frequency components included in a read signal. It goes without saying however that such low frequency components also include improper marks formed on a disc in a mirror surface state.

Moreover, saying in addition, while specific circuit elements and their values have been illustrated as circuit configurations of the respective filters, a variety of other configurations are also contemplated in addition to those described above for embodying the present invention.

Although a variety of means have been described in a limited sense in the foregoing embodiment, they may be otherwise improved or modified as required within a scope in which those skilled in the art can design such improvements or modifications.

According to the present invention described above in detail, the time base correction for a read signal can be accomplished in a simple configuration.

Also, according to the present invention, a jitter component produced when a driving signal is supplied to a spindle motor can be precisely removed.

What is claimed is:

1. An apparatus for reproducing information recorded on an optical disc comprising:

a spindle motor for rotating an optical disc;

reading means for optically reading a recorded signal on said optical disc to generate a read signal corresponding to said recorded signal;

digital converting means for digitizing said read signal to reproduce an encoded signal;

a spindle error signal generator for generating a spindle error signal representing deviation in phase of a phase component contained in said encoded signal from a reference clock pulse signal;

a servo circuit for generating a speed control signal for the rotational speed control of said spindle motor in response to said spindle error signal;

a drive circuit for generating a driving power discontinuously changing in magnitude with said speed control signal; and a high cut filter for removing from said driving power high frequency components which are caused by the discontinuous changes in level from higher to lower or vice versa thereof and for supplying the resultant driving power to said spindle motor, wherein said high frequency components include audible frequencies.

2. An apparatus for reproducing information recorded on an optical disc according to claim 1, wherein said high cut filter is an active high cut filter.

3. An apparatus according to claim 2, wherein said active filter is a second order active filter.

4. An apparatus for reproducing information recorded on an optical disc according to claim 1, wherein said drive circuit includes:

means for generating a driving signal in accordance with said control signal;

said drive signal being discontinuously and non-periodically changing in level;

a high cut filter for removing said high frequency component from said driving signal; and an output amplifier for transmitting an output signal of said filter as said driving power to said spindle motor.

5. An apparatus according to claim 1, wherein said driving power includes consecutively appearing acceleration parts and deceleration parts which are separate from each other.

* * * * *